United States Patent Office 3,138,737
Patented June 23, 1964

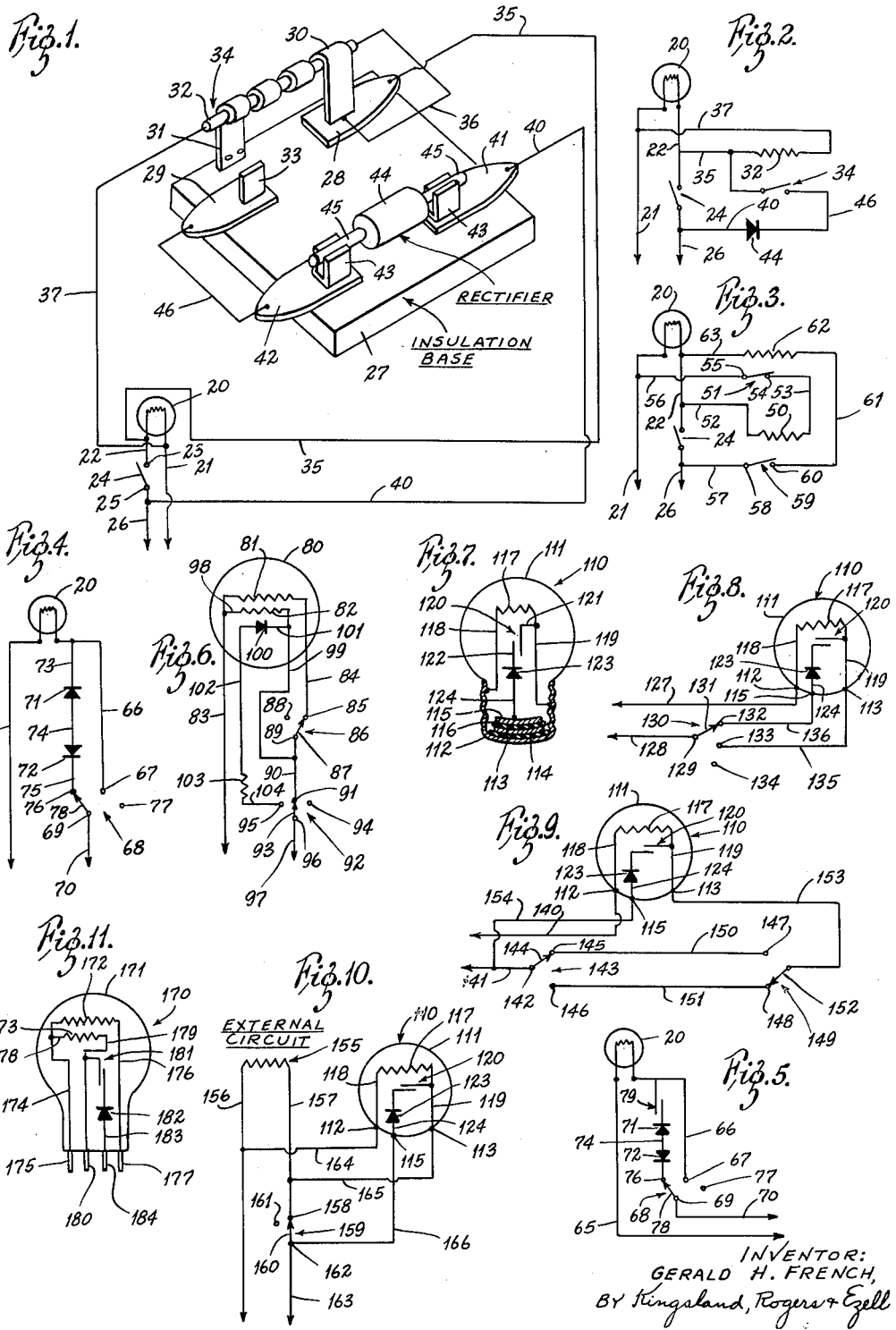

3,138,737
SWITCHING MEANS FOR A LOAD CIRCUIT WITH AN AUXILIARY TIME DELAY CUTOUT CIRCUIT
Gerald H. French, 9530 Theodosia Ave., Overland 14, Mo.
Filed Jan. 30, 1961, Ser. No. 85,674
8 Claims. (Cl. 315—50)

This invention relates to a control system for an electrical device having a main circuit for connecting the device across a power supply, and more particularly to a control system that provides an auxiliary circuit for the device, which auxiliary circuit will maintain a reduced magnitude of power across the device for an interval of time after the main circuit has been opened.

The essence of the control system includes the provision of an auxiliary circuit that has a normally open temperature responsive switch connected in series with a power reducing device. Under certain circumstances, that will be explained, the temperature responsive switch and the power reducing device may be combined into a single element of the auxiliary circuit. Furthermore, the temperature responsive switch may be any known device or apparatus which, when connected into a circuit, will open or close that circuit in response to different temperature levels. The auxiliary circuit also includes the electrical device being controlled and the normal power supply for that device.

The main circuit includes the electrical device being controlled and the power supply, and includes a source of heat. Any heat source will work satisfactorily so long as the heat emitted is sufficient to produce a response from the temperature responsive switch. Typical heat sources may include a suitable resistor or the heat from the electrical device itself.

When the main circuit is closed, the device will function in its usual manner, and the heat source will emit heat. The emitted heat will cause the temperature responsive switch to close the auxiliary circuit. Thereafter, when the main circuit is opened, the auxiliary circuit will transmit power from the power supply to the device. However, because the supply of heat begins to recede when the main circuit is opened, the temperature responsive switch will reopen after an interval of cooling time; and because the auxiliary circuit includes the power reducing device, the power transmitted to the device by the auxiliary circuit will be less than that of the main power supply.

A principal object of the invention, therefore, is to provide a control system for an electrical device that will transmit a reduced magnitude of power to the electrical device for an interval of time after the main circuit for connecting the electrical device to a power supply has been opened.

With the principal object is the object of providing such a control system that will automatically terminate the transmission of reduced power to the electrical device upon the passage of a predetermined time interval.

In general, the invention is illustrated as having two preferred embodiments of about equal importance with a third embodiment that combines the advantageous features of the two preferred embodiments. Other embodiments are illustrated, and there are some that are not included herein which, nevertheless, fall within the scope and spirit of the invention.

One preferred embodiment incorporates a bimetallic switch as the temperature responsive switch in the auxiliary circuit. The bimetallic switch is in series with a voltage reducing device, such as a half wave rectifier. Heat is supplied to close the bimetallic switch when the main circuit for the device to be controlled is closed and when the main circuit is opened, the bimetallic switch maintains the auxiliary circuit closed until the bimetallic switch cools below its contact breaking temperature.

Accordingly, an important object of the invention is to provide a control system for an electrical device including means for transmitting a reduced magnitude of power to the electrical device for an interval of time after the main connection of the device to its normal power supply has been broken, including means for positively engaging the operation of the control system, and for positively, and automatically, disengaging the control system. Specifically, an object of the invention is to provide such a control system wherein the engaging and disengaging means comprises a bimetallic switch and the means for transmitting a reduced magnitude of power includes a half-wave rectifier for clipping a portion of the power supply voltage.

The second preferred embodiment of the invention involves use of diode rectifier means in the auxiliary circuit. In the latter circuit, advantage is taken of the fact that, while a one-half wave rectifier will normally permit the flow of current in only one direction, there is a critical temperature above which the rectifier will break down, at least partially, and permit current to flow in both directions. Yet, when the temperature of the rectifier again drops below the critical value, the rectifier will again function normally to block the flow of current in one direction.

Because of these operating characteristics of transistor diodes, the second preferred embodiment of the invention incorporates a diode rectifier into an auxiliary circuit. If the source of power is direct current, a single diode rectifier is oriented to normally block the flow of current through the auxiliary circuit to the device. If the power source is alternating current, the auxiliary circuit may employ two rectifiers, oppositely oriented to oppose the flow of current in either direction. There are means for applying heat to the single rectifier in the case of a direct current power supply (and to one of the rectifiers if the power supply is alternating current). The heat applying means functions when the main circuit of the device is closed. The heat applying means may be the device or may be any external heat source.

The rectifier will become heated so that, upon opening the main circuit, the rectifier will allow current to pass through the device. However, the power supplied to the device by the auxiliary circuit will be less than that of the power source because, even though the heated rectifier passes current in a direction that it would normally block, the rectifier, nevertheless, supplies some resistance current flow. In addition, when the power supply is alternating curernt, the second, oppositely oriented rectifier will block half the current flow and cause the power supplied across the device to be further reduced.

It is, therefore, another important object of the invention to provide an auxiliary circuit control for an electrical device, the auxiliary circuit including means for transmitting power to the electrical device after the main circuit to the power supply has been opened, with means for reducing the magnitude of power transmitted by the auxiliary circuit and for opening the auxiliary circuit upon the passage of a time interval following opening of the main circuit. In particular, an object is to provide such an auxiliary circuit wherein the means for reducing the power transmitted and for opening the auxiliary circuit comprises diode rectifier means.

The diode rectifier control system imparts a variable power supply to the device because the amount of current passed by the diode in the direction which the diode would normally block depends upon the temperature of the diode. In other words, the amount of current passed by the diode increases in correspondence (not necessarily proportional) to increased temperatures of the diode above its "breakdown" temperature. In contrast, the bimetallic switch is either open or closed, and, when closed, does not affect the amount of current passed. The choice between the diode and the bimetallic switch as a switch means for opening and closing the auxiliary circuit will often depend upon the device being controlled and the effect desired.

As mentioned, the diode rectifier control system may comprise a single diode for normally blocking the flow of direct current or a pair of oppositely oriented diodes for normally blocking the flow of alternating current. Yet, whereas for all practical purposes, virtually all the current in one direction is blocked by a diode rectifier, there may be an extremely small amount of current flow in that one direction. Under circumstances where it is desirable to completely block the flow of current in one direction, the bimetallic switch and the diode rectifier may be employed together. If they are connected in series, and both positioned to respond to temperature changes imparted by a heat source, the bimetallic switch will, when cooled, assure the opening of the auxiliary circuit. In a sense, such use of the series connected diode and bimetallic switch produces a safety device against the flow of current when the auxiliary circuit should be open. If the bimetallic switch is constructed to open after the diode has cooled below its critical "breakdown" temperature, the control will be effected entirely by the diode, and the bimetallic switch will merely assure that the auxiliary circuit is finally opened. Similarly, a bimetallic switch may be connected in series with two oppositely oriented diode rectifiers to provide the same safety feature.

Accordingly, a further object of the invention is to provide an auxiliary circuit for an electrical device that employs the characteristics of an overheated diode rectifier to transmit a reduced power supply to the device and to gradually stop virtually all the transmission of power after a time interval, and that employs a positive-acting switch to completely open the auxiliary circuit upon passage of the time interval.

An important feature of the invention is the fact that it may be built right into any electrical device that emits heat during its normal operation. An example of such a device is a conventional light bulb. Both the temperature responsive switch (either the bimetallic switch or the diode) and the power reducing rectifier may be mounted within the bulb, the temperature responsive switch being constructed to respond to the temperature of the bulb itself. Accordingly, it is another important object of the invention to provide a control system that may be contained within a conventional light bulb, which control system will operate to maintain a reduced power supply to the light bulb after the main power supply circuit has been opened.

Still another object is to provide a control system as before mentioned that requires no power during normal operation of the device being controlled.

Other objects and advantages will appear from a more detailed description of the invention.

In the drawings:

FIGURE 1 is an isometric and schematic view of the invention illustrating a bimetallic switch and a rectifier connected to control a light bulb;

FIGURE 2 is a wiring diagram for the arrangement of FIGURE 1;

FIGURE 3 is a modification of the invention employing a resistor as the power reducing element and employing a second auxiliary circuit for providing additional control of the time interval before which the auxiliary circuit will be opened;

FIGURE 4 is another embodiment of the invention employing oppositely oriented diodes for use in alternating circuit controls;

FIGURE 5 is a circuit diagram similar to that of FIGURE 4, but with a bimetallic switch connected in series with the diode rectifiers;

FIGURE 6 is still another embodiment of the invention illustrating a schematic diagram of a control circuit for a direct current lamp;

FIGURE 7 is a schematic diagrammatic view, partly in section, illustrating another embodiment of the invention with the control mechanism positioned within a lamp bulb;

FIGURE 8 is a schematic wiring diagram for the light bulb of FIGURE 7;

FIGURE 9 is another wiring diagram for the light bulb of FIGURE 7;

FIGURE 10 is still another wiring diagram for the light bulb of FIGURE 7 for controlling an external circuit; and FIGURE 11 is a schematic view of still another embodiment of the invention illustrating a control system for installation within a three-way light bulb.

Referring to the drawings, the circuit of FIGURE 1 includes a lamp bulb 20 that is connected to one side of an alternating current power source by a wire 21. A wire 22 connects the other side of the lamp 20 to a switch terminal 23 of a switch 24. The other switch terminal 25 is connected by a wire 26 to the other side of the alternating current power source. Thus, a conventional circuit for the lamp 20 is provided, which circuit may be opened and closed by operation of the switch 24.

In the embodiment of FIGURE 1, the control system for the lamp 20 is mounted upon a non-conductive base 27. As illustrated, there are two electrically conductive contact plates 28 and 29 attached to the base 27. The contact plate 28 supports a spirally wound bimetallic strip 30 with the free end 31 of the bimetallic strip 30 constituting a switch contact member. The bimetallic strip 30 is electrically conductive and makes electrical contact with plate 28. Supported within the coil of the spirally wound bimetallic strip 30 is a resistor 32 having a substantial resistance to the flow of current so that the resistor 32 will emit heat when electrons are forced through it.

The plate 29 supports and makes electrical contact with an electrically conductive and upwardly extending plate 33 for making contact with the contact member 31. Therefore, the combination of the bimetallic strip 30, with its contact member 31, and the upwardly extending plate 33 constitutes a temperature responsive switch 34.

The resistor 32 is connected in parallel with the lamp 20 across the alternating source of power. For this purpose, there is a wire 35 connected to the wire 22 and to the plate 28. One end of a wire 36 is connected to the plate 28 and the other end of the wire 36 is connected to an end of the resistor 32. Another wire 37 is connected between the other end of the resistor 32 and the wire 21. From the foregoing, it can be seen that the circuits to the lamp 20 and to the resistor 32 are open until the switch 24 is closed. When the switch 24 is closed, the lamp 20 is illuminated and the resistor 32 is heated and transmits heat to the surrounding atmosphere and to the switch 34. The magnitude of the resistor 32 and the construction of the bimetallic strip 30 is such that, after a short duration, the heat of the resistor will cause the contact member 31 to contact the contact member 33.

Within a period of time after the switch 24 is thus closed, another circuit is established across the power supply, which circuit includes a wire 40 connected at one end to the wire 26 and at the other end to an electrically conductive plate 41 mounted on the base 27. Another electrically conductive plate 42 is mounted on the base 27, and the plates 41 and 42 have conductive brackets 43 that make electrical contact with plates 41 and 42 and support a rectifier 44. The rectifier 44 has conductive leads 45 that make electrical contact with the brackets 43. Finally, a wire 46 connects the plate 42 to the plate 29 so that the auxiliary circuit may be traced from the wire 26, the wire 40, the plate 41, the bracket 43, the conductive lead 45, the rectifier 44, the conductive lead 45, the bracket 43, the plate 42, the wire 46, the plate 29, the contact member 33, the contact member 31, through the bimetallic strip 30, the plate 28 and the wire 35, to the wire 22 which comprises the auxiliary switching circuit.

In the operation of the circuits as described, upon the closing of the switch 24, lamp 20 will light, resistor 32 will emit heat, and after a short period of time, the bimetallic switch 34 will warp, thus causing the contact 31 to make electrical contact with the contact 33, establishing the auxiliary switching circuit paralleling switch 24. After the switch 24 is opened, the temperature responsive switch 34 will remain closed for a period of time (for example, a minute or so, which time is variable according to the heat of the resistor and the construction of the switch 34). The power delivered to the lamp 20 and the resistor 32 must now travel a course through the auxiliary switching circuit. The rectifier 44 will now effectively stop the flow of current in one direction, thus reducing the current through and the voltage across the resistor 32 and the lamp 20. This reduction of voltage across and current through the lamp 20 and the resistor 32 will effectively cause a dimming of the illumination of the lamp 20 and a reduction in heat output of the resistor 32. The reduction of the heat output of the resistor 32 will, after a period of time, allow the bimetallic switch 34 to cool sufficiently to break the electrical contact between the contact members 31 and 33 of the switch 34. When this takes place, the main power line supplying the power to the lamp 20 and the resistor 32 is opened, and the lamp 20 and resistor 32 will cease to function.

FIGURE 2 is a schematic wiring diagram of the invention illustrated in FIGURE 1. FIGURE 2 also demonstrates that the resistor 32 may be placed in proximity to a conventional bimetallic switch 34, the important consideration being that the resistor 32 must be close enough to heat the switch 34.

In the circuit of FIGURE 3, a resistor is substituted for the rectifier 44, and there is an additional resistor and switch combination for providing further control over the time duration that the lamp remains lit after the switch 24 is opened. In the circuit of FIGURE 3, the main circuit for the lamp comprises the wires 21 and 26 with the switch 24 in the circuit of the wire 26, and the wire 22 connecting the lamp 20 to the switch 24. This main circuit is the same as the main lamp circuit for the lamp 20 of FIGURE 1. In the circuit of FIGURE 3, a resistor 50 and a temperature responsive switch 51 are connected in parallel with the lamp 20 across the power lines 21 and 22. Thus, there is a wire 52 connected to the wire 22 of the power line, the wire 52 being connected to one side of the resistor 50. The other side of the resistor 50 is connected by a wire 53 to a terminal 54 of the switch 51. The other terminal 55 of the switch 51 is connected by a wire 56 to the other power line 21. The bimetallic switch 51 is normally closed and is opened when sufficient heat is applied to it.

The control circuit of FIGURE 3 is completed by the connection of a wire 57 to the wire 26 and to a switch terminal 58 of a normally open temperature responsive switch 59. The other terminal 60 of the switch 59 is connected by a wire 61 to one side of a resistor 62. The other side of the resistor 62 is connected by a wire 63 to the power line 22.

The operation of FIGURE 3 is as follows. When the main switch 24 is closed, the lamp 20 lights. In addition, a circuit is established through the resistor 50. When the resistor 50 transmits sufficient heat to the switch 59, the switch 59 closes.

The circuit comprising the switch 59, which is now closed, and the resistor 62 which terminates on the wires 22 and 26 is short circuited while the switch 24 is closed. When the switch 24 is opened, the current will flow through the auxiliary circuit including the switch 59, the wire 61, the resistor 62, the lamp 20 and back to the line 21. However, because of the voltage drop across the resistor 62, the voltage impressed across the lamp 20 will be reduced from that supply by the power source. Hence, the lamp 20 will glow at less brilliance than when operated by the main circuit.

When all of the current supplied by the power source passes through the resistor 62, it heats and transmits its heat to the normally closed bimetallic switch 51. Heating of the bimetallic switch 51 causes that switch to open, opening the circuit of the resistor 50. Thereafter, the bimetallic switch 59 is allowed to cool and open. When the switch 59 opens, the circuit to the lamp is broken.

The circuit of FIGURE 4 employs two diodes connected in series, but oppositely oriented to completely block the flow of alternating current under normal operating conditions. The main circuit for the lamp 20 of FIGURE 4 includes a power line 65 connected to one side of the lamp filament, and a power line 66 connected to the other side of the lamp filament. The power line 66 is connected to a switch terminal 67 of a three-position switch 68. The common terminal 69 of the three-position switch 68 is connected by a wire 70 to the other side of the power source. The diodes 71 and 72 are connected in opposite directions and in series by a wire 73 that is connected to the wire 66, and to one side of the diode 71. The other side of the diode 71 is connected by a wire 74 to one side of the diode 72. The other side of the diode 72 is connected by a wire 75 to another terminal 76 of the three-position switch 68. The remaining terminal 77 of the three position switch 68 is an off-switch terminal.

Ordinarily, diodes 71 and 72 will effectively pass alternating current in only one direction. Because of the series combination, diode 71 would pass alternating current in only one direction, whereas the diode 72 would effectively prevent the passage of alternating current in that direction. However, the embodiment of FIGURE 4 is based upon the fact that a solid state type rectifier will temporarily break down in its prime function at temperatures within a critical range and will pass current relatively easily in both directions when stimulated by high temperatures. The breakdown is temporary because when the diode again cools, it will perform its normal function of passing current in only one direction.

The operation of the circuit of FIGURE 4 is as follows. When the switch arm 78 of the three position switch 68 is in contact with the terminal 67, the main circuit to the lamp 20 is completed and the lamp will light. If no illumination is desired after the contact with the terminal 67 is broken, the switch arm 78 may be swung over to the terminal 77. In that event, the lamp 20 will not light. However, if the control circuit of the invention is to be employed to control the lamp 20, the switch arm 78 is turned into contact with the terminal 76. Then the diode 72 will pass current in only one direction. Ordinarily, the diode 71 would have passed current in only one direction, but the diode 71 being in close proximity to the lamp 20 will have been heated above a predetermined critical value. Therefore, immediately after the switch arm 78 is moved from the terminal 67 to the terminal 76, the diode 71 will pass current in either direction. Current will therefore be allowed to pass in one direction, the other direction being prevented by the diode 72. Hence, a circuit through the diodes 71 and 72 and the lamp 20 is completed across the power source with the voltage transmitted to the lamp 20 being approximately one-half of the rated voltage due to the control of the diode 72. Because of the resulting lower brilliance and power output of the lamp 20 which, in turn, is due to the lower voltage, and because of the non-linearity of the resistance of the lamp 20 due to the reduction of power, the temperature of the diode begins to drop. As the temperature of the diode 71 drops, it begins to restrict the passage of current in one direction so that the voltage drop across the lamp 20 is further reduced. A further temperature reduction in the diode 71 results from the reduced voltage across the lamp 20, and the process continues until the temperature of the diode falls below that temperature at which the diode 71 will again conduct in only one direction. Under that condition, the diodes 71 and 72 will cooperate to prevent the flow of current and the lamp 20 will go out.

FIGURE 5 adds a temperature responsive, bimetallic switch 79 in series with the diodes 71 and 72. The switch 79 is positioned to respond to the heat of the lamp 20. The temperature at which the switch 79 will open and close should be somewhat below the critical "breakdown" temperature of the diode 71.

The operation of the circuit of FIGURE 5 is the same as that for FIGURE 4, except that the switch 79 will close before the diode 71 begins to be conductive in the same direction as permitted by the diode 72. Therefore, when the switch arm 78 is moved into contact with the terminal 76, some current will flow past the diodes 71 and 72, as was explained in connection with the description of FIGURE 4, and that current flow is transmited through the lamp 20 because the switch 79 is closed. As the diode 71 and the switch 79 begin to cool, the resistance of the diode 71 to current flow will gradually increase, and the lamp 20 will burn more dimly. When the diode 71 has finally cooled below its "breakdown" temperature, the lamp 20 will go out. However, the diodes 71 and 72 may still pass a very small amount of current. Shortly after the lamp 20 goes out, the further reduction in the temperature of the switch 79 will cause the switch to open. With the switch 79 again opened, the flow of current through the auxiliary circuit will be completely stopped.

It is recognized that the invention may be practical by the substitution of a Zener diode for any of the voltage reducing components previously described (for example, the diode 44 of FIGURE 2 or the diode 71 of FIGURE 5). The controlling factor in the selection of the diode is that its breakdown point (the voltage level above which the diode will conduct in a reverse direction with a substantially constant voltage drop across the diode) must be lower than that voltage which is to be impressed across the diode. For example, if the Zener diode be substituted for the diode 71 of FIGURE 5, the circuit will operate as described except that the voltage transmitted across the lamp 20 will be constant while the auxiliary circuit is closed. Because of the constant voltage drop across the Zener diode (in place of the diode 71) that voltage drop across the lamp 20 will be reduced below normal, allowing the bimetallic switch 79 to cool and finally open.

The circuit of FIGURE 6 illustrates employment of the invention under conditions in which the power supply is direct current. An important application of the invention of FIGURE 6 might be to control the brilliance of automobile headlights after the main switch has been turned off. In the circuit of FIGURE 6, there is illustrated a lamp 80 having two filaments 81 and 82. One side of the filament 81 is connected to a power line 83. The other side of the filament is connected by a wire 84 to a switch terminal 85 of a two position dimmer switch 86. The switch arm 87 of the switch 86 is movable between the terminal 85 and an "off" terminal 88. The switch arm 87 is connected to a terminal 89, and the terminal 89 is connected by a wire 90 to a terminal 91 of a three position on-off switch 92. The switch arm 93 of the switch 92 is movable between an "off" terminal 94, the terminal 91 and a third terminal 95. The switch arm 93 is connected to a terminal 96, and the terminal 96 is connected to the power line 97.

One side of the filament 82 is connected by a wire 98 to the power line 83, and the other side of the filament is connected by a wire 99 to the wire 90. Under normal operation of the lamp 80, which may be an automobile lamp, the switch 92 may be moved into contact with the terminal 91 to turn the lamp on. Thereafter, the lamp 80 will burn brightly or dimly according to the position of the dimmer switch 86. When the switch 86 is in the position illustrated with the switch arm 86 contacting the terminal 85, both the filaments 81 and 82 will be parallel connected across the voltage source, and the lamp 80 will burn brightly.

However, if the switch is moved out of contact with the terminal 85 and into contact with the terminal 88, the circuit to the filament 81 will be broken. Under that dimmed condition the filament 82 only will be connected across the power supply.

The control circuit includes a diode rectifier 100 connected by a wire 101 to the wire 99, and by a wire 102 to a resistor 103. The other side of the resistor 103 is connected by a wire 104 to the switch terminal 95. The diode 100 is oriented so that ordinarily it would not pass direct current to the lamp from the power supply. Diode 100 is chosen so that the heat from either the filament 82 or 81 or their combination in parallel will be sufficient to cause the diode 100 to temporarily break down and allow current to flow in the reverse position.

In the operation of the circuit of FIGURE 6, the switches 86 and 92 are placed in the positions illustrated, and the lamp 80 burns brightly as has been described. When the lamp 80 is to be turned off, the delay illumination may be eliminated by moving the switch arm 93 to contact the terminal 94. However, the delayed operation may be incorporated into the function of the lamp 80 by moving the switch arm 93 into contact with the terminal 95. Due to the heat of the filaments when fully illuminated, the diode 100 will have exceeded the critical temperature above which it will not transmit current. Therefore, a circuit will be completed from the wire 97, the switch arm 93, the wire 104, the resistor 103, the wire 102, the diode 100, the wire 101, the wire 99, the filament 82 and back to the power supply through the wire 83. With switch 86 in the position as illustrated, the filament 81 is connected in parallel with the filament 82. This circuit consists of the wire 99, from the wire 101, the wire 90, the switch 86, and its components 85, 87 and 89, the wire 84, the filament 81 and the wire 83. When the switch arm 87 of the switch 86 is placed in contact with the switch post 88 of the switch 86, the circuit paralleling the filament 81 with the filament 82 is broken, thus allowing only the filament 82 to become illuminated. Regardless of the position of the dimmer switch 86, it will be noted that all of the electron flow will be through the resistor 103. The function of the resistor 103 is to limit the flow of electrons so that the heat of the filament 82 alone or the combined heat of the filaments 82 and 81 will allow the diode 100 to cool. Cooling of the diode 100 further limits the flow of electrons, and the action continues until the lamp 80 goes out. With the circuit of FIGURE 6, an automobile operator is given sufficient time to park his car, turn off the lights, and walk to his house while the head lamps glow dimly to light his path.

FIGURE 7 shows how the invention might be connected directly to a light bulb to be contained wholly within the light bulb. The physical parts of the light bulb 110 are conventional. They include a glass globe 111, a threaded base 112 that is electrically conductive, an electrically conductive ring 113 separated from the base 112 by an insulator ring 114, and an electrically conductive center contact 115 separated from the ring 113 by an insulator ring 116. One side of the filament 117 of the lamp 110 is connected by a wire 118 to the electrically conductive threaded base 112. The other side of the filament 117 is connected by a wire 119 to the electrically conductive ring 113.

A normally open bimetallic switch 120 is connected by a wire 121 to the wire 119. The other side of the switch 120 is connected by a wire 122 to one side of a diode rectifier 123. The other side of the rectifier 123 is connected by a wire 124 to the center contact 115. The switch 120 is placed near the heat source and the diode rectifier is placed as far as practical from the heat source.

One form of wiring for the lamp 110 is illustrated in FIGURE 8 and includes a power line 127 that contacts the electrically conductive base 112 of the lamp. The other power line 128 is connected to a switch terminal 129 of a three position switch 130. The switch arm 131 of the switch 130 is movable between contacts 132, 133 and 134. The contact 133 is connected by a wire 135 to the conductive ring 113. The contact 132 is connected by a wire 136 to the center contact member 115. This wiring is compatible with the standard wiring for a conventional three-way lamp.

In the operation of the circuit of FIGURE 8, and of the lamp of FIGURE 7, the off position of the switch 130 would be effected with the switch arm 131 in contact with the terminal 134. When the switch arm 131 is moved into contact with the terminal 133 a circuit including the power line 128, the wire 135, the filament 117, and the power line 127 is completed so that the lamp 110 will light. When the lamp 110 lights, the heat of the lamp causes the temperature responsive switch 120 to close. Thereafter, if the switch arm 131 is moved into contact with the terminal 132, there will be a circuit from the power line 128, the switch arm 131, through the wire 136, the diode 123 and the switch 120 to the filament 117, returning by the wire 118 to the power line 127. Because the diode 123 eliminates half the voltage, the power supplied to the filament 117 will be halved. Therefore, the temperature of the filament 117 will be reduced, allowing the switch 120 to cool so that it ultimately opens and causes the lamp 110 to cease to burn.

FIGURE 9 is a diagrammatic view of a circuit employing the lamp of FIGURE 7 for operation by dual switches. In the circuit of FIGURE 9, one power line 140 is connected to the lamp base 112. The other power line 141 is connected to a switch terminal 142 of a two-way switch 143. The switch arm 144 of the switch 143 is movable between terminals 145 and 146. The terminals 145 and 146 are connected to a pair of switch terminals 147 and 148 of another two-way switch 149 by a pair of wires 150 and 151, respectively. The switch arm 152 of the switch 149 is connected to the conductive ring 113 of the lamp 110 by a wire 153. Finally, the center contact 115 of the lamp is connected by a wire 154 to the wire 141.

The operation of FIGURE 9 includes a typical dual two-way switch arrangement whereby the lamp 110 may be turned on or off by operation of either the switch 143 or the switch 149. As illustrated, the lamp is not connected across the power line, however, if the switch arm 144 is moved into contact with the terminal 146 and the switch arm 152 left in place, or the switch arm 144 left in contact with the contact 145 and the switch arm 152 moved into contact with the terminal 147, the lamp will light.

When the lamp 110 of FIGURE 9 is lit, the switch 120 will be heated and will close as in the circuit of FIGURE 8. Thereafter, when the main circuit is opened, by having the switch arm 144 of the switch 143 in contact with its terminal 145 and having the switch arm 152 of the switch 149 in contact with its terminal 148, or reversing both switch arms 143 and 149 to their respective terminals 146 and 147, the remaining switching circuit and supplying power to the lamp 110 will be by way of the wire 154, the lamp terminal 115, the wire 124, the diode rectifier 123, the closed bimetallic switch 120, the filament 117, the wire 118, the threaded base 112, and the wire 140. At this point in the operation of the lamp, the same sequence of events will take place as described in the description of FIGURE 7.

FIGURE 10 illustrates another use for the lamp 110 as a control for an external circuit. In the embodiment of FIGURE 10, the external circuit (which might be a fluorescent type lamp) is indicated schematically by a resistor 155. One side of the resistor 155 is connected by a wire 156 to one side of the power supply. The other side of the resistor 155 is connected by a wire 157 to a switch terminal 158 of a two position switch 159. The switch arm 160 of the switch 159 is movable between the terminal 158 and an "off" terminal 161. The switch arm 160 is connected to a terminal 162, and the terminal 162 is connected by a wire 163 to the other side of the power supply.

A wire 164 connects the power line 156 to the terminal 112, and a wire 165 connects the power line 157 to the terminal 113 of the lamp 110. Finally, a wire 166 connects the switch terminal 162 to the terminal 115.

In the operation of the circuit of FIGURE 10, connecting the switch arm 160 to the terminal 158 connects the external circuit 155 across the power supply. Because the lamp 110 is in parallel with the external circuit 155, it also is connected across the power supply. Thus, the external circuit will operate and the lamp 110 will be illuminated. Illumination of the lamp 110 causes the filament 117 thereof to heat the bimetallic switch 120 and close that switch. Thereafter, when the switch 159 is moved into off position with the switch arm 160 in contact with the terminal 161, the power supply to the external circuit will be broken. However, there will be a circuit across the external circuit including the power line 163, the wire 166, the diode 123, the bimetallic switch 120, the wire 119, the wire 165, the wire 157, the external circuit 155, and back to the power supply by way of the wire 156. Again, the power supplied to the external circuit will be reduced because of the clipping action of the diode 123. Also, the duration of power supplied to the external circuit will be dependent upon the cooling time of the bimetallic switch 120.

FIGURE 11 illustrates the application of the invention to a lamp having two filaments. As will be appreciated from the following description, the number of filaments in the lamp may be increased for different illumination levels and to permit various durations of the off-cycle time.

The lamp 170 has a globe 171 within which are positioned two filaments 172 and 173. One side of the filament 172 is connected by a wire 174 to a connecting pin 175. The other side of the filament 172 is connected by a wire 176 to another connecting pin 177. A side of the other filament 173 is connected by a wire 178 to the wire 174, and the other side of the filament 173 is connected by a wire 179 to a connecting pin 180.

The control for the lamp 170 includes a bimetallic switch 181, one side of which is connected to the wire 179. The other side of the bimetallic switch 181 is connected to a diode rectifier 182. The diode rectifier 182 in turn is connected by a wire 183 to another pin 184.

In the operation of the lamp of FIGURE 11, the pin 175 is common and is always connected to one side of a power supply. The pins 177, 180 and 184 are selectively connectable to the other side of the power supply by an appropriate switch. When the pin 177 only is connected to the other side of the power supply, the filament 172 will burn, but the filament 173 will not be connected and will remain unilluminated. When only the pin 180 is connected to the other side of the power supply, the filament 173 alone will burn and the filament 172 will be unilluminated. When the pins 177 and 180 are simultaneously connected to the other side of the power supply, the parallel connected filaments 172 and 173 will both illuminate. Such an arrangement is typical of a three-way lamp. The filament 173 has greater resistance than the filament 172 so that the filament 172 will burn brighter than the filament 173. When both filaments are connected, the lamp 170 will emit its highest candle power.

In any of the foregoing connections, the bimetallic switch 181 will close and will be warped to a certain extent by the temperature of the lamp 170. When the pin 180 is connected, the temperature of the bimetallic switch 181 will be low, but will be sufficient to close the switch. When the pin 177 is connected, the filament 172, which has less resistance than the filament 173, and therefore burns brighter and gives off more heat, will cause the bimetallic switch 181 to store more heat as it closes. Therefore, the cooling time for the switch 181 will be greater when the switch 181 has been heated by the filament 172 than when it has been heated by filament 173. When it has been heated by both filaments 172 and 173, the switch 181 will remain closed for an even greater duration of time.

The switch 181 and the diode rectifier 182 are connected across the power supply when the pin 184 is connected to the other side of the power supply. When the pin 184 is connected, only the filament 173 will glow. In addition, because of the rectifier 182, the brilliance of the filament 173 will be substantially reduced so that its temperature will be substantially lower than that of the switch 181. The switch 181 will cool until the contact is broken and the lamp goes out in the manner already explained for preceding embodiments.

While the invention has been described primarily in connection with light bulbs, it has many other uses. For example, the control system might be wired to any heat transmitting electrical appliance, such as a toaster or a coffee maker. In the case of the toaster, the control system could be employed to maintain reduced power across the heating coil to keep the toast warm. Significantly, the auxiliary circuit may be interrupted in its function at any time if the main circuit is to be closed. In other words, users of the toaster would not be required to wait for the lapse of the interval of the auxiliary warming circuit before reoperating the toaster. And when the last piece of toast has been made, the auxiliary circuit will be ultimately broken without further action on the part of the user.

Various changes and modifications may be made within the process of this invention as will be readily apparent to those skilled in the art. Such changes and modifications are within the scope and teaching of this invention as defined by the claims appended hereto.

What is claimed is:

1. A control circuit for a device comprising a source of electrical power, a main circuit for wiring the device across the power source, a switch for alternately opening and closing the main circuit, and an auxiliary circuit across the power source, the auxiliary circuit including the device, a normally open switch in the auxiliary circuit having a switch closing element for closing the normally open switch in response to an increase in the temperature of the closing element above a predetermined value, means responsive to closing of the main circuit for increasing the temperature of the closing element above the predetermined value, to close the normally open switch, the closing of the normally open switch causing the auxiliary circuit to be closed, and means connected into the auxiliary circuit for causing the power transmitted to the device by the auxiliary circuit to be substantially and perceptably reduced below the magnitude of the power source.

2. The combination of claim 1 wherein the last mentioned means comprises rectifier means.

3. The combination of claim 1 wherein the last mentioned means comprises resistor means in the auxiliary circuit, the auxiliary circuit including the device and the resistor means in series.

4. The combination of claim 3 wherein the auxiliary circuit short circuits the main circuit switch, and the means for increasing temperature of the closing element comprises a resistor connected across the power supply when the main circuit switch is closed, a normally closed temperature responsive switch in series with the temperature increasing resistor, the normally closed switch being operable in response to an increased temperature of the power reducing resistor means.

5. A control system for an electrical device comprising a main circuit for connecting the device across a source of electrical power, a switch in the main circuit for opening and closing the main circuit, an auxiliary circuit for connecting the device across the power source, the auxiliary circuit including a temperature responsive switch and rectifier means connected in series with the device, and means responsive to closing of the main circuit for increasing the temperature of the temperature responsive switch to close the auxiliary circuit and responsive to opening of the main circuit for allowing the temperature of the temperature responsive switch to cool, the temperature responsive switch having means for causing it to open automatically when cooled a sufficient amount, the temperature increasing means having sufficient capacity to cause the temperature of the temperature responsive switch to reach such a value that the cooling time of the temperature responsive switch will cause the auxiliary circuit to remain closed for a time interval after the main circuit has been opened.

6. The system of claim 5 including an external circuit in series with the auxiliary circuit, the external circuit being connectable across the power source when the main circuit is closed.

7. The system of claim 5 wherein the device includes variable levels of heat transmitting resistance, the main circuit switch includes means for selectively connecting one of the resistance levels across the power source, and the temperature increasing means comprises the heat transmitting resistance of the device, the time interval during which the auxiliary circuit remains closed being variable according to which resistance level of the device is connected across the power source.

8. A control system for an electric lamp of the type connectable across a power supply with switch means for making and breaking the connection comprising heater means in series with the switch means, means responsive to an increase in the temperature of the heater means for establishing an auxiliary connection of the lamp across the power supply, means for maintaining the auxiliary connection for an interval of time after the first mentioned connection has been broken, means for breaking the auxiliary connection after the time interval has lapsed, and means for substantially and perceptably reducing the power transmitted by the auxiliary connection substantially below the power of the power supply.

References Cited in the file of this patent
UNITED STATES PATENTS

| | | |
|---|---|---|
| 2,262,061 | Somers | Nov. 11, 1941 |
| 2,806,980 | Shapiro | Sept. 17, 1957 |
| 2,932,774 | Rice | Apr. 12, 1960 |